United States Patent [19]

Free

[11] Patent Number: 5,268,906
[45] Date of Patent: Dec. 7, 1993

[54] METHOD AND APPARATUS FOR HIGH SPEED PARALLEL COMMUNICATIONS

[75] Inventor: Gordon G. Free, Freeland, Wash.

[73] Assignee: Traveling Software, Inc., Bothell, Wash.

[21] Appl. No.: 2,534

[22] Filed: Jan. 7, 1993

Related U.S. Application Data

[63] Continuation of Ser. No. 657,172, Feb. 19, 1991, abandoned.

[51] Int. Cl.⁵ .............................................. H04L 1/00
[52] U.S. Cl. ........................................ 371/5.5; 371/28
[58] Field of Search .................... 371/5.5, 28; 395/575

[56] References Cited

U.S. PATENT DOCUMENTS

| | | | |
|---|---|---|---|
| 3,753,234 | 8/1973 | Gilbert et al. | 340/172.5 |
| 4,161,025 | 7/1979 | Dahy et al. | 364/200 |
| 4,355,354 | 10/1982 | Kempf et al. | 364/200 |
| 4,371,928 | 2/1983 | Barlow et al. | 364/200 |
| 4,473,879 | 9/1984 | Tachiuchi et al. | 364/200 |
| 4,606,044 | 8/1986 | Kudo | 371/5.5 |
| 4,638,428 | 1/1987 | Gemma et al. | 364/200 |
| 4,646,300 | 2/1987 | Goodman et al. | 371/33 |
| 4,710,925 | 12/1987 | Negi | 371/5.5 |
| 4,748,625 | 5/1988 | Krause et al. | 371/5.5 |
| 5,095,494 | 3/1992 | Takahashi et al. | 371/5.5 |
| 5,105,423 | 4/1992 | Tanaka et al. | 371/5.5 |

*Primary Examiner*—Charles E. Atkinson
*Attorney, Agent, or Firm*—Christensen, O'Connor, Johnson & Kindness

[57] ABSTRACT

A method and apparatus for transmitting data between computers. By determining an optimum time for which a sending computer (10) must set a strobe pulse on a strobe line (54) in order for a receiving computer (30) to be able to read data transmitted, the sending computer can transmit data without the need to poll an acknowledge line (56). The optimum strobe pulse duration is determined by sending a copy of a known pattern of data from the sending computer to the receiving computer using different strobe pulse durations. The receiving computer examines the received pattern of data to determine if an error occurred during transmission. If an error occurred, the sending computer sets the acknowledge line. The optimum hold time is determined to be the shortest hold time for which the sending computer can set the strobe line and the receiving computer can receive the known pattern of data without error.

19 Claims, 4 Drawing Sheets

METHOD AND APPARATUS FOR HIGH SPEED PARALLEL COMMUNICATIONS

This application is a continuation application based on prior copending application Ser. No. 07/657,172, filed on Feb. 19, 1991 and now abandoned.

FIELD OF THE INVENTION

The present invention relates to computer communication in general, and in particular, to a method and apparatus for increasing the speed of communication between parallel or serial ports of personal computers.

BACKGROUND OF THE INVENTION

In computer communication technology, two benchmarks by which communication protocols are often compared are data transfer rate and error rate. Generally, these two performance criteria are directly related to each other such that an increase in speed usually results in a corresponding increase in error rate. Therefore, computer communication specialists are continually searching for communication protocols that allow an increase in the speed with which data are transferred between machines, without introducing a corresponding increase in error rate.

A conventional method for conveying data between computers, especially personal computers, involves the interconnection of a data bus disposed in a sending computer with a data bus disposed in a receiving computer via serial or parallel ports. The data are transmitted between parallel ports over a data link that includes two handshaking lines, generally referred to as a strobe line and an acknowledge line. The following steps are used to transmit data from the sending computer to the receiving computer:

1. the sending computer loads a piece of data on the data link through a parallel data port;
2. the sending computer sets the strobe line;
3. the receiving computer recognizes the setting of the strobe line and reads the data from the data link through its parallel data port;
4. the receiving computer sets the acknowledge line;
5. the sending computer recognizes the setting of the acknowledge line, resets the strobe, and loads the next piece of data to be sent on the data link;
6. the receiving computer recognizes the resetting of the strobe and resets the acknowledge line; and
7. the sending computer recognizes the setting of the acknowledge line and sets the strobe line for the next piece of data to be sent.

The above method is very safe, since data are only sent from the sending computer to the receiving computer as fast as the receiving computer can handle them. Unfortunately, the delays spent polling or checking the status of the strobe and acknowledge lines reduces the overall rate at which data can be sent from the sending computer to the receiving computer. Therefore, it is desirable to implement a method of data communication between two computers whereby unnecessary delays spent polling the acknowledge line can be eliminated, without causing a corresponding rise in the error rate.

SUMMARY OF THE INVENTION

The present invention is a method of transmitting data from a sending computer to a receiving computer. The method comprises the steps of determining an optimum hold time for which the sending computer must set a strobe signal to ensure that the receiving computer can read the data transmitted without error. Upon determining the optimum hold time, the data are transmitted from the sending computer to the receiving computer by repetitively placing the data on a communication link disposed between the sending computer and the receiving computer and setting the strobe signal for a time at least equal to the optimum hold time to alert the receiving computer that data are being transmitted over the communication link. The optimum hold time is determined by transmitting copies of a known pattern of data from the sending computer to the receiving computer. The receiving computer compares the pattern of data received with a known pattern of data provided to the receiving computer. The receiving computer sets a flag if the received pattern of data contains an error. The step of transmitting a copy of a known pattern of data from the sending computer to the receiving computer is repeated using different hold times until an optimum hold time is determined. The optimum hold time is the minimum hold time for which the receiving computer accurately receives the known pattern of data without setting the flag.

DESCRIPTION OF THE PREFERRED EMBODIMENT

Figure 1:
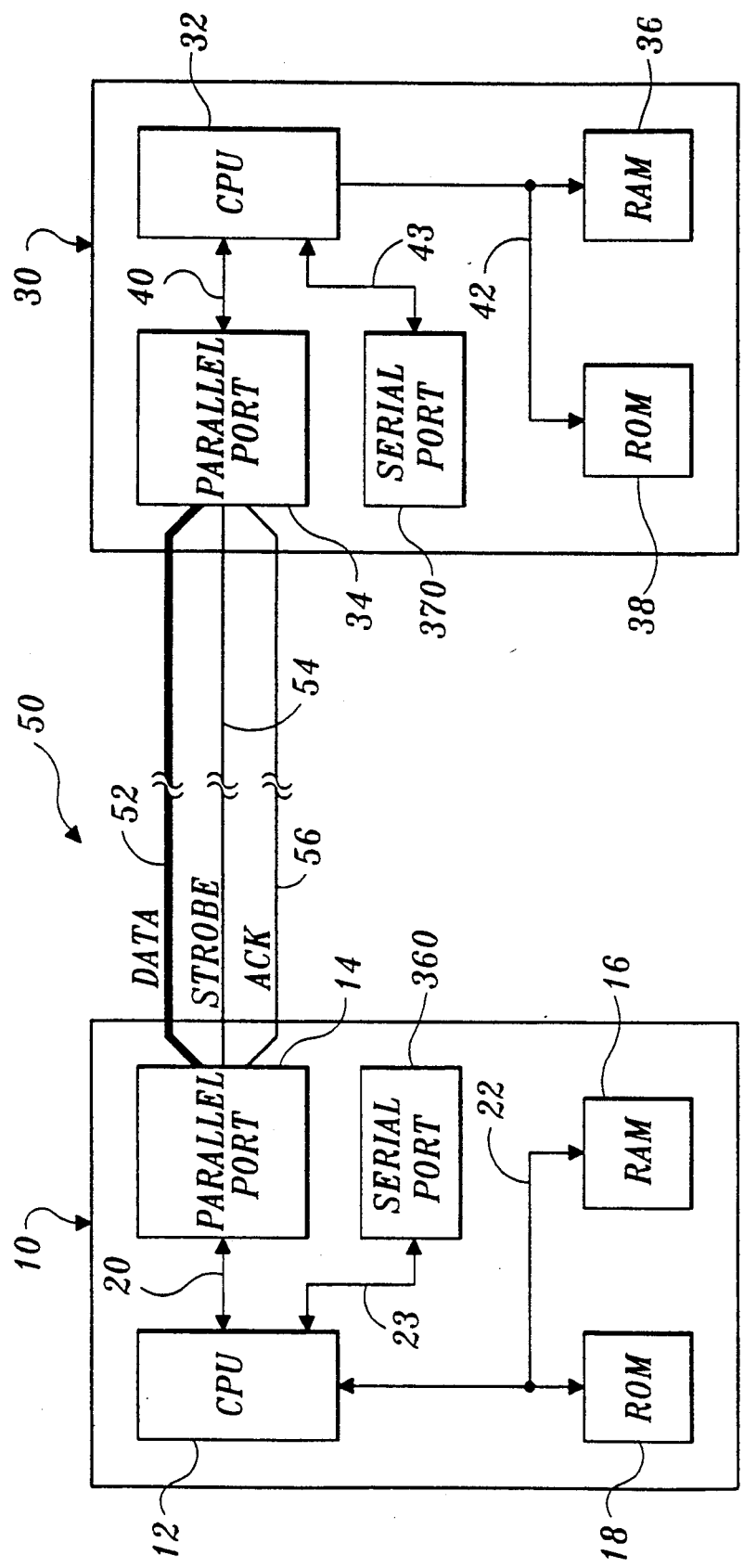
FIG. 1 is a block diagram of a communications network disposed between two computers.

FIG. 1 is a block diagram of a computer communications network. A sending computer 10 comprises a central processing unit (CPU) 12, a parallel communications port 14, a serial port 360, a random access memory (RAM) 16 and a read only memory (ROM) 18. CPU 12 is connected to parallel communications port 14 by a data bus 20 and to a serial port 360 by a data bus 23 (which may be the same as data bus 20). RAM 16 and ROM 18 are connected to CPU 12 by data/address lines 22. Connected to parallel communications port 14 is a communications link shown generally at 50. Communications link 50 comprises a data link 52, a strobe line 54, and an acknowledge line 56. Strobe line 54 carries a strobe signal generated by sending computer 10 to alert a receiving computer 30, described below, that data are being transmitted. However, it is realized strobe 54 could be an integral part of data link 52.

Also connected to communications link 50 is receiving computer 30. Receiving computer 30 comprises a CPU 32, a parallel communications port 34, a serial port 370, a RAM 36 and a ROM 38. CPU 32 is connected to parallel communications port 34 by a data bus 40 and to serial port 370 by a data bus 43 (which may be the same as data bus 40). RAM 36 and ROM 38 are connected to CPU 32 by data/address lines 42. In the preferred embodiment, data link 52 is configured for either 4-bit or 8-bit parallel data transfer. However, the present invention will work equally well in connection with parallel data transfers of any number of bits or with a serial data link.

Figure 2:
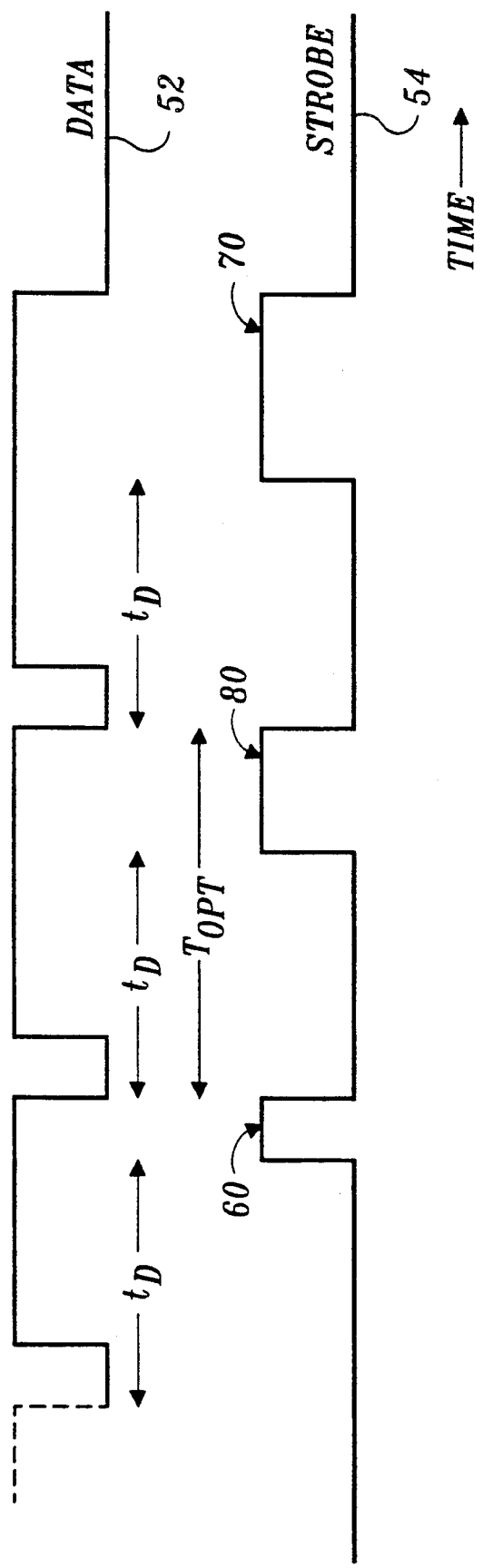
FIG. 2 is a timing diagram of a data link and a strobe line.

FIG. 2 shows a timing diagram of data link 52 and strobe line 54 as they are used in the method of communication according to the present invention. Like the prior art method described above, the present method of computer communications involves the steps of placing data to be sent from sending computer 10 to receiving computer 30 on data link 52 and setting a strobe signal to alert receiving computer 30 that data are being transmitted. However, in the present invention, sending computer 10 does not need to poll acknowledge line 56 to see if receiving computer 30 has received the data transmitted. This savings of time is achieved by ensuring that the data are only transmitted at a rate at which receiving computer 30 can accept them. If the strobe pulse on strobe line 54 is set for a period of time that is too short, receiving computer 30 will not have time to read the data from data link 52. However, if the strobe pulse on strobe line 54 is set for a time that is longer than necessary for receiving computer 30 to read the data transmitted via data link 52, then the efficiency of the communications method is reduced. Because sending computer 10 may need to communicate with a variety of receiving computers 30, each of which may be capable of receiving data at different rates, sending computer 10 must determine the optimum or shortest strobe pulse duration for each receiving computer.

The time required for sending computer 10 to place data to be transmitted on data link 52 is generally limited by the speed at which CPU 12 operates and by an inherent capacitance of data link 52. With reference to FIG. 2, a time $t_D$ denotes the minimum time it takes for sending computer 10 to place data to be transmitted on data link 52. After the time $t_D$, sending computer 10 sets strobe line 54 to alert receiving computer 30 that data are being transmitted.

By way of example, a strobe pulse 60 may be too short in duration to allow receiving computer 30 to read the data transmitted over data link 52 without error. Conversely, a strobe pulse 70 may allow receiving computer 30 enough time to read the data transmitted via data link 52; however, the duration of strobe pulse 70 may be longer than necessary, thereby reducing the data transfer rate of the communications system below its optimum. The duration of a strobe pulse 80 thus represents an optimum time interval necessary for the sending computer to set the strobe pulse on strobe line 54 to ensure receiving computer 30 can reliably read data transmitted via data link 52. By determining the optimum strobe pulse duration, the need for the communications system to poll acknowledge line 56 is eliminated. The fastest rate, $T_{OPT}$, at which data can be sent from sending computer 10 to receiving computer 30 without error is therefore determined by the setup time of data link 52, $t_D$, plus the optimum duration of strobe pulse 80 sent over strobe line 54.

Figure 3A:
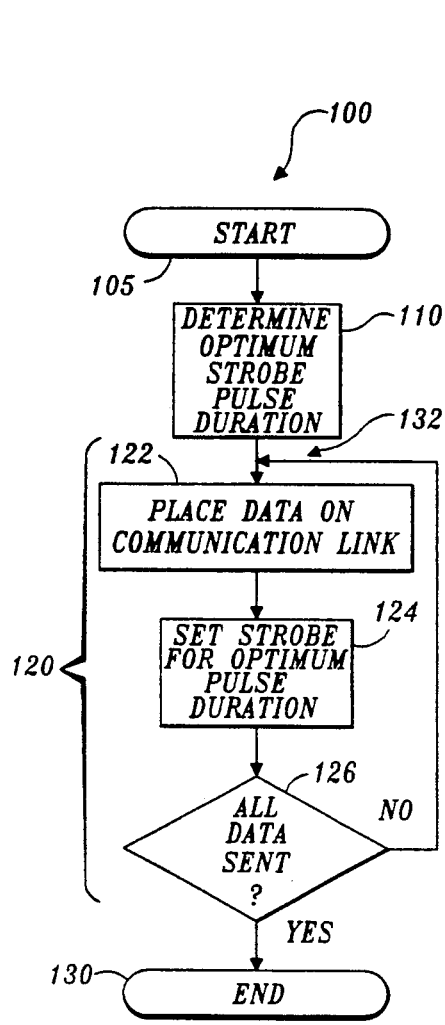
FIG. 3A is a flow chart of a computer program used to implement a method of computer communications according to the present invention.

FIG. 3A is a flow chart of a computer program 100 that determines the optimum strobe pulse duration to implement the method of computer communication according to the present invention. Computer program 100 is loaded into and run by the CPUs in the sending and receiving computers. In the preferred embodiment, program 100 and a subroutine 200 are transferred from a storage medium, such as a floppy disk, to RAMs 16 and 36 of the sending and receiving computers, so that the machine instructions can be implemented by CPUs 12 and 32, respectively. Included within program 100 are known patterns of data used to determine the optimum pulse duration. Beginning at a start block 105, program 100 proceeds to a block 110, where a subroutine 200 (shown in FIG. 3B) is called that determines the optimum strobe pulse duration in order to assure that the receiving computer has just enough time to read the data from data link 52. Once the optimum strobe pulse duration has been determined, the subroutine returns to program 100, which proceeds to a main loop 120 that transfers data from the sending computer to the receiving computer. Main loop 120 comprises a block 122 wherein data are placed on the data link, and a block 124 where the strobe line is set for a period of time equal to the optimum strobe pulse duration previously determined. A decision block 126 determines if all the data have been sent from the sending computer to the receiving computer. If the answer to decision block 126 is yes, the program ends at a block 130; if the answer to decision block 126 is no, program 100 loops back to a point 132 in main loop 120 and transmits another piece of data using the method of blocks 122, 124, and 126.

Figure 3B:
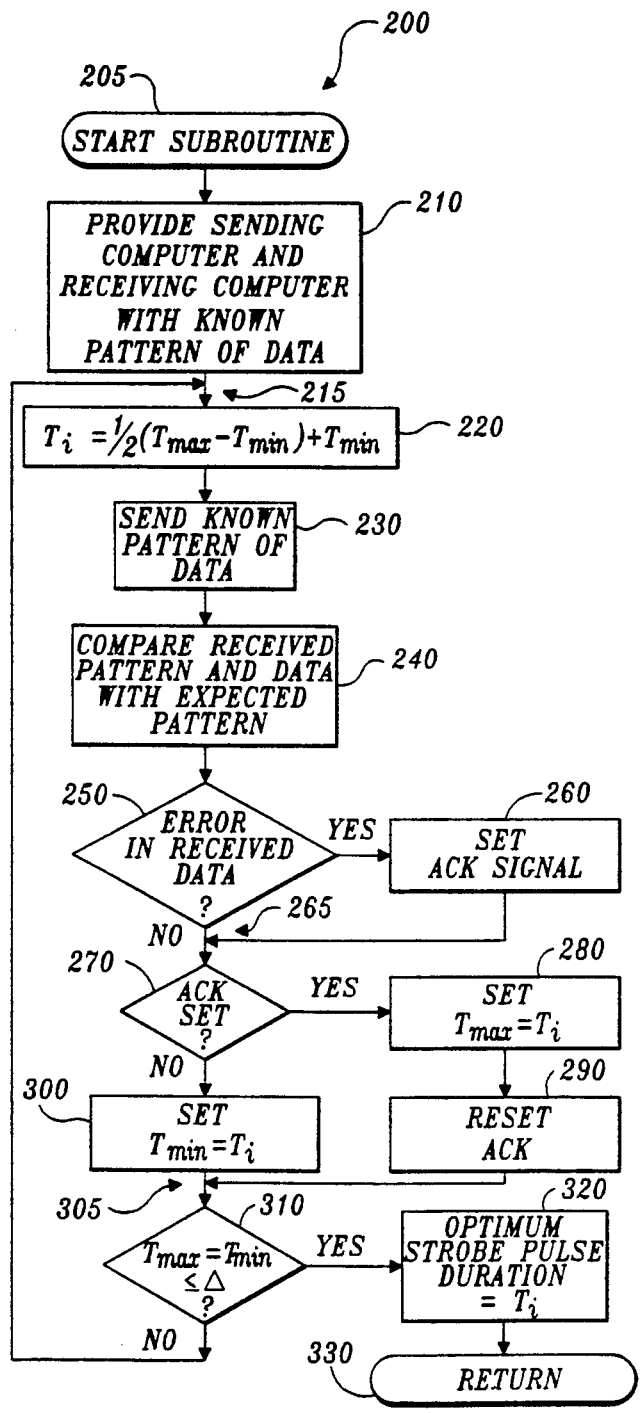
FIG. 3B is a flow chart of a computer subroutine used to implement a method for determining an optimal strobe pulse duration according to the present invention.

FIG. 3B shows a flow chart diagram of computer subroutine 200 used to implement block 110 in FIG. 3. Subroutine 200 begins at a start block 205 and proceeds to a block 210, wherein the known patterns of data are provided to both the sending computer and the receiving computer.

After block 210, subroutine 200 proceeds to a block 220, wherein an initial strobe pulse duration, $T_i$, is chosen. Initial strobe pulse duration, $T_i$, is set according to the formula:

$$T_i = \tfrac{1}{2}(T_{max} - T_{min}) + T_{min} \tag{1}$$

wherein a variable, $T_{max}$, is a predefined maximum foreseeable strobe pulse duration time that receiving computer 30 may need in order to be able to read data from data link 52. Similarly, a variable, $T_{min}$, is a predefined minimum strobe pulse duration time for which sending computer 10 can set strobe line 54. The values of variables $T_{max}$ and $T_{min}$ can be altered by a user in subroutine 200, but their initial values are fixed. Subroutine 200 then proceeds to a block 230, wherein a copy of the known pattern of data is transmitted from sending computer 10 to receiving computer 30 by the method of FIG. 3A using a strobe pulse duration time of $T_i$.

Upon completion of block 230, subroutine 200 proceeds to a block 240 where receiving computer 30 compares the received pattern of data with the known pattern of data provided in block 210. In the preferred embodiment, the known pattern of data comprises a series of 4-bit binary numbers. An error is detected by receiving computer 30 if one of the 4-bit numbers is out of order, appears twice, or differs in some other manner from what was expected as provided in the known pattern of data stored in the receiving computer. In a decision block 250, receiving computer 30 determines if an error occurred in the transmission of the known pattern of data. If the answer to decision block 250 is yes, then receiving computer 30 sets a flag, which, in the preferred embodiment, comprises setting acknowledge line 56 in a block 260 to alert sending computer 10 that an error occurred in the data transmission. After setting the flag on acknowledge line 56, subroutine 200 proceeds to a point 265. If the answer to decision block 250 is no, then subroutine 200 proceeds to point 265 without setting acknowledge line 56.

After point 265, subroutine 200 proceeds to a decision block 270, wherein the sending computer polls acknowledge line 56 to see if it is set. If the answer to decision block 270 is yes, then sending computer 10 sets variable $T_{max}$ equal to $T_i$ in a block 280, instructs receiving computer 30 to reset the acknowledge line in a block 290 and proceeds to a point 305. If the answer to decision block 270 is no, then sending computer 10 sets variable $T_{min}$ equal to $T_i$ in a block 300 and proceeds to point 305.

After point 305, subroutine 200 proceeds to a decision block 310. In decision block 310, sending computer 10 determines if:

$$T_{max} - T_{min} \leq \Delta \qquad (2)$$

where $\Delta$ is a predefined constant equal to the level of resolution desired in the optimum strobe pulse duration. The resolution time $\Delta$ is defined by the sending computer's ability to adjust the length of the strobe pulse duration, which in turn is dependent upon the sending computer's clock rate. If the answer to decision block 310 is yes, then subroutine 200 proceeds to a block 320 where the optimum strobe pulse duration is set to be the time $T_i$ before returning to program 100 in a block 330. If the answer to decision block 310 is no, subroutine 200 loops back to a point 215 to send another known pattern of data with a different strobe pulse duration $T_i$.

In this manner, subroutine 200 determines an optimum hold time to be used by program 100, shown in FIG. 3A. By setting the optimum hold time to the minimum amount of time the receiving computer needs to read the data from data link 52 without error, the need for sending computer 10 to poll acknowledge link 56 is eliminated. Therefore, a communications system using this method operates with increased efficiency without causing a corresponding increase in error rate.

As will be appreciated by those skilled in the art, the preferred embodiment of subroutine 200 performs a binary search on a set of possible strobe pulse duration times that exist between times $T_{min}$ and $T_{max}$ within a resolution of $\Delta$. However, it is apparent that other search strategies could be used to achieve the same result, such as starting with a time $T_{max}$ and working sequentially towards time $T_{min}$ in steps equal to the resolution time $\Delta$.

Figure 4:
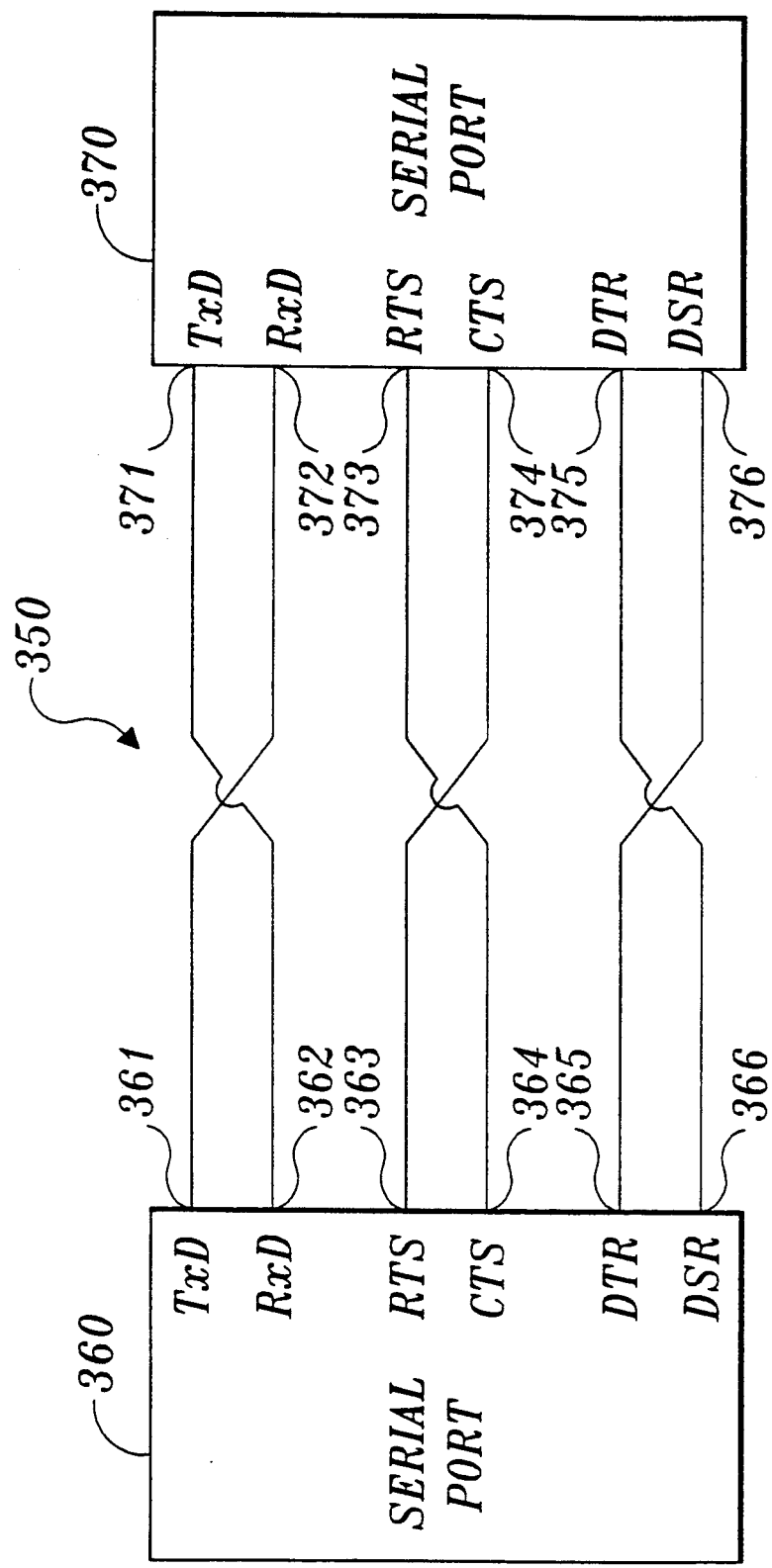
FIG. 4 is a block diagram of an alternative embodiment of a serial communications link in which the present invention is used.

FIG. 4 is a block diagram of a serial communications link 350 that can be used with the present invention. Serial communications link 350 comprises serial port 360 and serial port 370, described above in respect to FIG. 1. Serial port 360 comprises a transmit line (TxD) 361, a receive line (RxD) 362, a request to send line (RTS) 363, a clear to send line (CTS) 364, a data terminal ready line (DTR) 365, and a data set ready line (DSR) 366. Similarly, serial port 370 comprises a transmit line (TxD) 371, a receive line (RxD) 372, a request to send line (RTS) 373, a clear to send line (CTS) 374, a data terminal ready line (DTR) 375, and a data set ready line (DSR) 366. When serial port 360 is connected to serial port 370, line TxD 361 is coupled to line RxD 372, line RxD 362 is coupled to line TxD 371, line RTS 363 is coupled to line CTS 374, line CTS 364 is coupled to line RTS 373, line DTR 365 is coupled to line DSR 376 and line DSR 366 is coupled to line DTR 375.

In order to transmit data from serial port 360 to serial port 370, CPU 12 (shown in FIG. 1) places a byte of data in a transmit register within serial port 360 so that serial port 360 can transmit the data serially over line TxD 361, according to methods well known in the art. While the data is being transmitted over line TxD 361, CPU 12 remains idle.

Serial ports 360 and 370 also contain registers (not shown) that allow CPU 12 to set line RTS 363 and check the status of line CTS 364. The idle time of CPU 12 can be eliminated by transmitting data, one bit at a time, using lines RTS 363, 373 and lines CTS 364, 374. To transfer data this way, CPU 12 loads the register that controls line RTS 363 with a bit to be sent and raises line DTR 365 to alert the receiving serial port 370 that a bit is being transmitted. When line DTR 365 is raised, CPU 32 receives the bit transmitted by reading the status of line CTS 374. As with the case of data being transmitted between parallel ports, if line DTR 365 is raised for a period longer than necessary, the overall rate at which data can be sent from serial port 360 to serial port 370 is reduced. However, the method described above can be used to determine the optimum time that line DTR 365 must be raised so that receiving serial port 370 can receive the data transmitted without error. By substituting line DTR 365 for data line 52 and line DSR 366 for acknowledge line 56, as shown in FIG. 1, the optimum hold time can be used to allow the normally unused lines in serial ports 360, 370 to transmit data one bit at a time, at the fastest rate possible.

Although the present invention has been described with respect to its preferred embodiments, those skilled in the art will realize that changes may be made in form and scope without departing from the spirit of the invention. Therefore, the scope of the invention should be determined solely by reference to the following claims.

The embodiments of the invention in which an exclusive property or privilege is claimed are defined as follows:

1. A method of transmitting data in parallel from a sending computer to a receiving computer over a communications link that includes a data bus and a strobe line, the method comprising the steps of:
   determining an optimum time for which the sending computer must set a strobe signal on the strobe line so that the receiving computer can read the data transmitted without error;
   placing the data to be transmitted from the sending computer to the receiving computer on the data bus disposed between the sending computer and the receiving computer; and
   setting the strobe signal for at least the optimum time to alert the receiving computer that data are being transmitted over the communications link.

2. The method of claim 1, wherein the step of determining the optimum time further comprises the steps of:
   providing both the sending computer and the receiving computer with a known pattern of data;
   transmitting a copy of the known pattern of data from the sending computer to the receiving computer;
   comparing the pattern of data received by the receiving computer with the known pattern of data provided to the receiving computer;
   setting a flag if the received pattern of data is not substantially identical to the known pattern of data provided to the receiving computer; and
   checking the flag to determine if the copy of the known pattern of data was received by the receiving computer without error.

3. The method according to claim 2, wherein the step of transmitting a copy of the known pattern of data is repeated setting the strobe signal for a plurality of times until an optimum time for setting the strobe signal is determined.

4. The method of claim 3, wherein the optimum time is determined by finding the shortest time for which the strobe signal can be set when transmitting data from the sending computer to the receiving computer for which the receiving computer receives the copy of the known pattern of data without any error.

5. The method of claim 1, wherein the communications link transfers data in an 8-bit parallel format.

6. The method of claim 1, wherein the communications link transfers data in a 4-bit parallel format.

7. The method of claim 2, wherein step of setting the flag comprises changing a binary state of an acknowledge line connecting the sending computer and the receiving computer.

8. A method for increasing a rate of parallel data transmission between a sending computer and a receiving computer over a communications link that includes a data bus and a strobe line comprising the steps of:
(a) determining a faster transmission rate at which data can be sent by the sending computer and received by the receiving computer without error, wherein the step of determining the faster transmission rate further comprises the steps of:
 (i) providing the sending computer and receiving computer with a known pattern of data;
 (ii) transmitting a copy of the known pattern of data from the sending computer to the receiving computer using an initial strobe pulse duration;
 (iii) comparing a received copy of the known pattern of data received by the receiving computer with the known pattern of data provided to the receiving computer;
 (iv) setting a flag to alert the sending computer of an error if the received pattern of data contains an error as compared to the known pattern of data provided the receiving computer;
 (v) checking to see if the sending computer has set the flag;
 (vi) repeating steps (ii)–(v) using a plurality of strobe pulse durations until a shorter strobe pulse duration is determined for which the flag signal is not set; and
(b) transmitting data from the sending computer to the receiving computer using the shorter strobe pulse duration.

9. The method of claim 8, wherein the step of transmitting data further comprises the steps of:
placing data to be sent from the sending computer to the receiving computer on the data bus disposed between the sending computer and the receiving computer; and
setting a strobe signal for the shorter strobe pulse duration to alert the receiving computer that the data is being transmitted.

10. Apparatus for transmitting data in parallel from a sending computer to a receiving computer over a communications link that includes a data bus and a strobe line, comprising:
means for determining an optimum strobe pulse duration for which the sending computer must set a strobe signal so that the receiving computer can read the data transmitted without error;
means for placing the data to be transmitted from the sending computer to the receiving computer on the data bus disposed between the sending computer and the receiving computer; and
means for setting the strobe signal for at least the optimum strobe pulse duration to alert the receiving computer that data is being transmitted over the communications link.

11. The apparatus of claim 10, wherein the means for determining the optimum hold time further comprises:
means for providing the sending computer and the receiving computer with a known pattern of data;
means for transmitting a copy of the known pattern of data from the sending computer to the receiving computer;
means for comparing a pattern of data received by the receiving computer with the known pattern of data provided to the receiving computer;
means for setting a flag if the received pattern of data is not substantially identical to the known pattern of data provided to the receiving computer; and
means for checking the flag to determine if the copy of the known pattern of data was received by the receiving computer without error.

12. The apparatus of claim 10, wherein means for determining the optimum strobe pulse duration further comprises a computer program that searches a set of possible hold times that exists between a minimum possible time, $T_{min}$, and a maximum possible time, $T_{max}$, to find a shortest strobe pulse duration for which the receiving computer can receive a copy of the known pattern of data without error.

13. The apparatus of claim 10, wherein the data bus comprises an 8-bit parallel data link.

14. The apparatus of claim 10, wherein the data bus comprises a 4-bit parallel data link.

15. The apparatus of claim 11, wherein the means for setting the flag operates to change a binary state of an acknowledge line connecting the sending computer and the receiving computer.

16. A method of transmitting data one bit at a time from a sending computer that includes a sending serial communications port to a receiving computer that includes a receiving serial communications port wherein each serial communications port includes a transmit line, a receive line, a request to send line (RTS), a register that controls the RTS line, a clear to send line (CTS), a register that reads the CTS line, and a data terminal ready line (DTR), the method comprising:
placing a bit to be transmitted from the sending computer to the receiving computer in the register that controls the RTS line in the sending serial communications port;
setting the DTR line on the sending serial communications port for an optimum time to alert the receiving computer that a bit is being transmitted; and
reading the register that reads CTS line on the receiving serial communications port to determine the bit being transmitted.

17. The method of claim 16, further comprising the step of:
determining the optimum time the DTR line on the sending serial communications port should be set to alert the receiving computer that a bit is being transmitted by:
 (i) providing the sending computer and the receiving computer with a known pattern of data;

(ii) transmitting a copy of the known pattern of data from the sending computer to the receiving computer;

(iii) comparing the data received by the receiving computer with the known pattern of data provided to the receiving computer;

(iv) setting a flag if the received pattern of data is not substantially identical to the known pattern of data provided to the receiving computer, and (v) checking the flag to determine if the pattern of data was received without error.

18. The method of claim 17, wherein the step of transmitting a copy of the known pattern of data is repeated by setting the DTR line on the sending serial communications port for a plurality of times until the optimum time for setting the DTR line is determined.

19. The method of claim 18, wherein the optimum time is determined by finding the shortest time for which the DTR line on the sending serial communications port can be set when transmitting data from the sending computer to the receiving computer for which the receiving computer receives the known pattern of data without any error.

* * * * *